United States Patent
Zhu et al.

(10) Patent No.: US 7,620,208 B2
(45) Date of Patent: Nov. 17, 2009

(54) SYSTEM AND METHOD FOR DETECTING FEATURES FROM IMAGES OF VEHICLES

(75) Inventors: Ying Zhu, Monmouth Junction, NJ (US); Binglong Xie, Bethlehem, PA (US); Visvanathan Ramesh, Plainsboro, NJ (US); Martin Pellkofer, Pentling (DE); Thorsten Köhler, Deuerling (DE)

(73) Assignees: Siemens Corporate Research, Inc., Princeton, NJ (US); Siemens Aktiengesellschaft, Munich (DE)

( * ) Notice: Subject to any disclaimer, the term of this patent is extended or adjusted under 35 U.S.C. 154(b) by 588 days.

(21) Appl. No.: 11/313,599

(22) Filed: Dec. 21, 2005

(65) Prior Publication Data
US 2006/0177100 A1 Aug. 10, 2006

Related U.S. Application Data

(60) Provisional application No. 60/651,411, filed on Feb. 9, 2005.

(51) Int. Cl.
*G06K 9/00* (2006.01)
*H04N 7/18* (2006.01)

(52) U.S. Cl. .................................. 382/104; 348/118
(58) Field of Classification Search .............. 382/104
See application file for complete search history.

(56) References Cited

U.S. PATENT DOCUMENTS 3,889,234 A 6/1975 Makihara et al.
5,937,079 A * 8/1999 Franke .................. 382/103
6,965,684 B2 * 11/2005 Chen et al. ............. 382/103
7,046,822 B1 * 5/2006 Knoeppel et al. ........ 382/103
7,466,841 B2 * 12/2008 Bahlmann et al. ....... 382/103
2002/0081032 A1 * 6/2002 Chen et al. ............. 382/199
2004/0071346 A1 * 4/2004 Clark et al. ............. 382/209
2005/0002570 A1 * 1/2005 Clark et al. ............. 382/199
2005/0129276 A1 * 6/2005 Haynes et al. .......... 382/103

FOREIGN PATENT DOCUMENTS

EP 1324259 7/2003

OTHER PUBLICATIONS

Satoshi Yamaguchi et al: "A Car Detection System Using the Neocognitron" Proceedings of the International Joint Conference on Neural Networks. Singapore, Nov. 18-21, 1991, New York, IEEE, US, vol. vol. 2, Nov. 18, 1991, pp. 1208-1213, XP000326389 ISBN: 0-7803-0227-3 abstract Sections 2 and 3.1 figures 1-6.

* cited by examiner

*Primary Examiner*—Vikkram Bali
*Assistant Examiner*—Max Shikhman
(74) *Attorney, Agent, or Firm*—Donald B. Paschburg; F. Chau & Associates, LLC

(57) ABSTRACT

A method of detecting a feature of a vehicle in an image of a vehicle includes providing a digitized image of a vehicle, providing a first filter mask over a first subdomain of the image, where the filter mask is placed to detect a feature in the image, calculating a function of a gradient of the image inside the first masked subdomain, and detecting the presence or absence of a vehicle feature within the first masked subdomain based on the value of the gradient function.

24 Claims, 17 Drawing Sheets

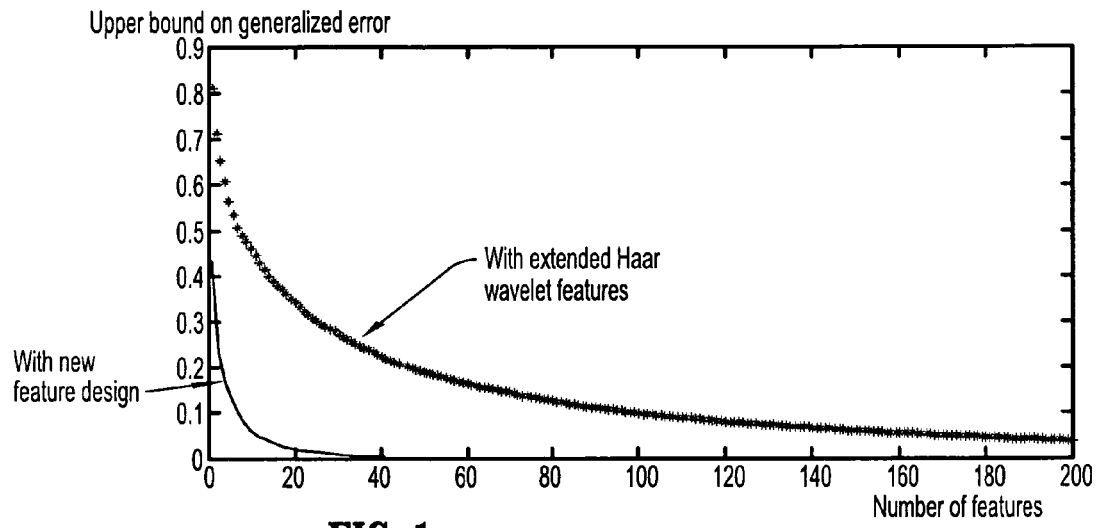
FIG. 1 Bound on the generalized error.
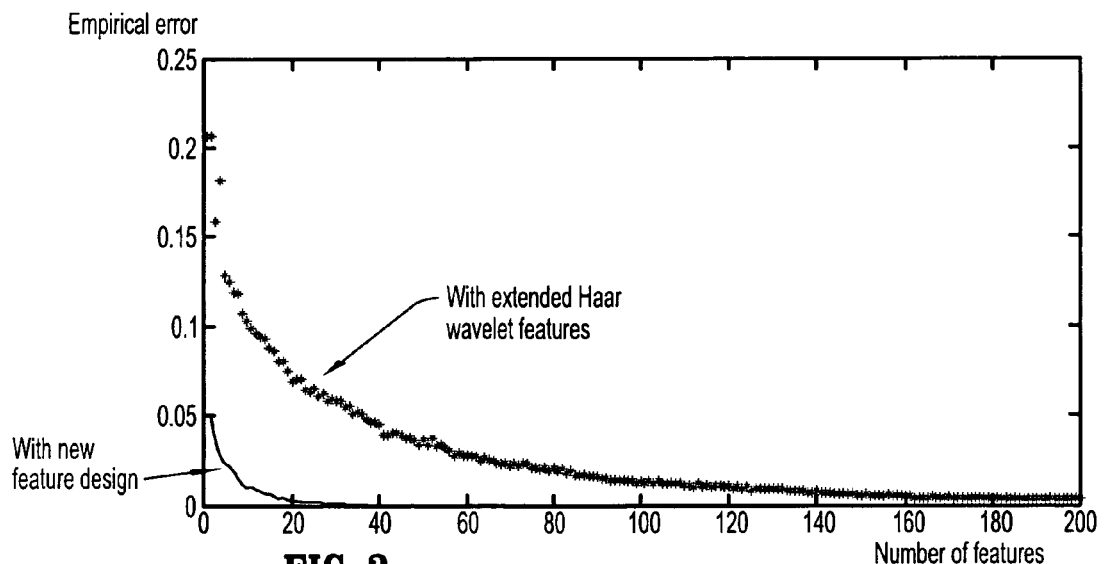
FIG. 2 Empirical error.

FIG. 3 Back-view of a truck:
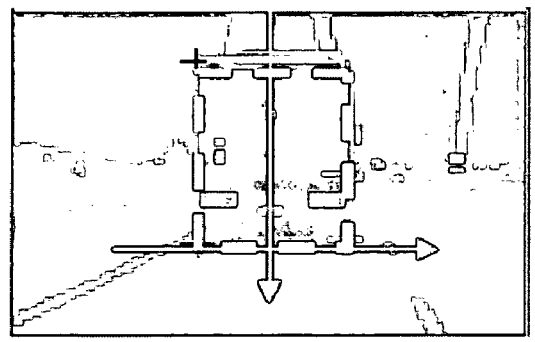
FIG. 4
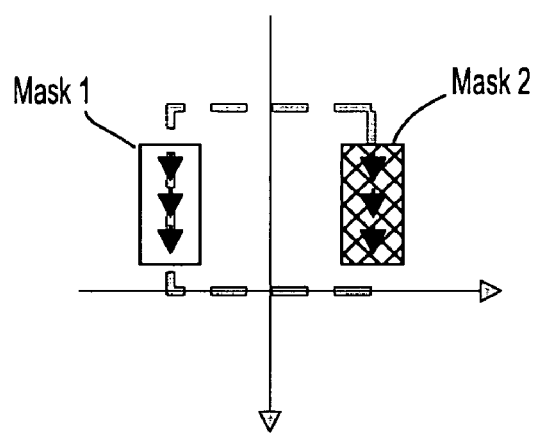
FIG. 5
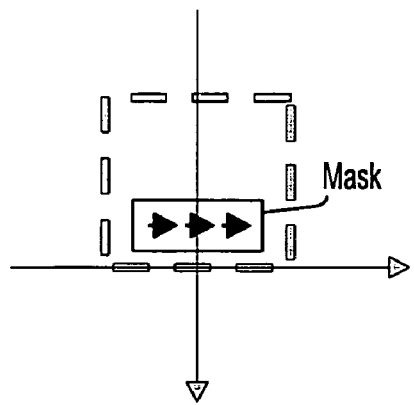

Bottom Left　　　　　Bottom Right

Bottom Left · Bottom Right

Bottom Left · Bottom Right

Bottom Left · Bottom Right

FIG. 30
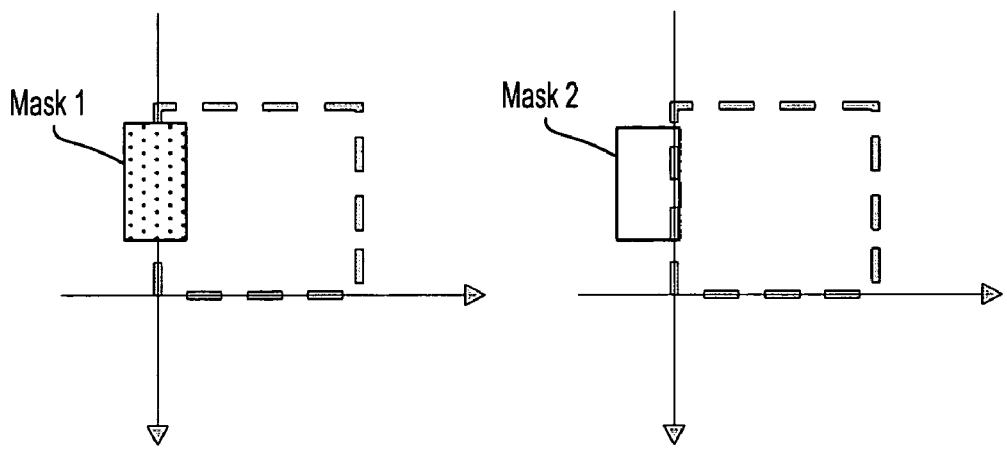
Bottom Left
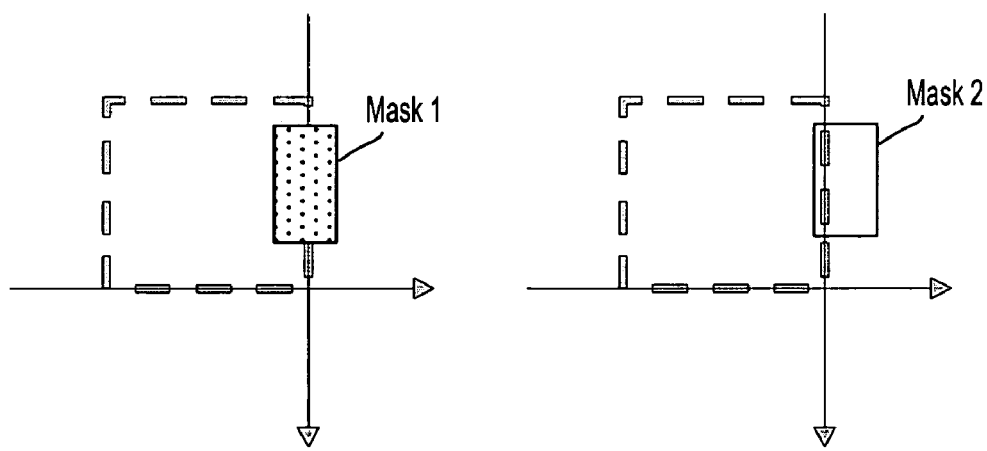
Bottom Right

FIG. 31
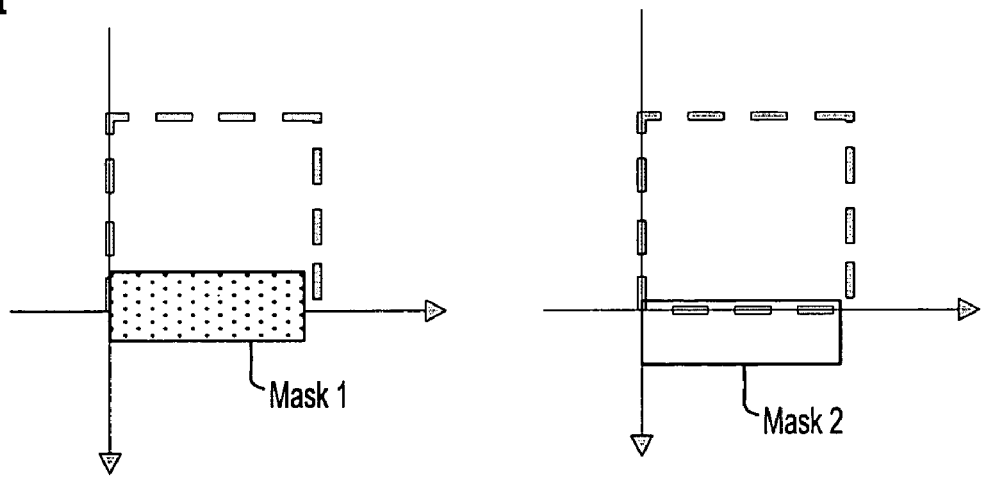
Bottom Left
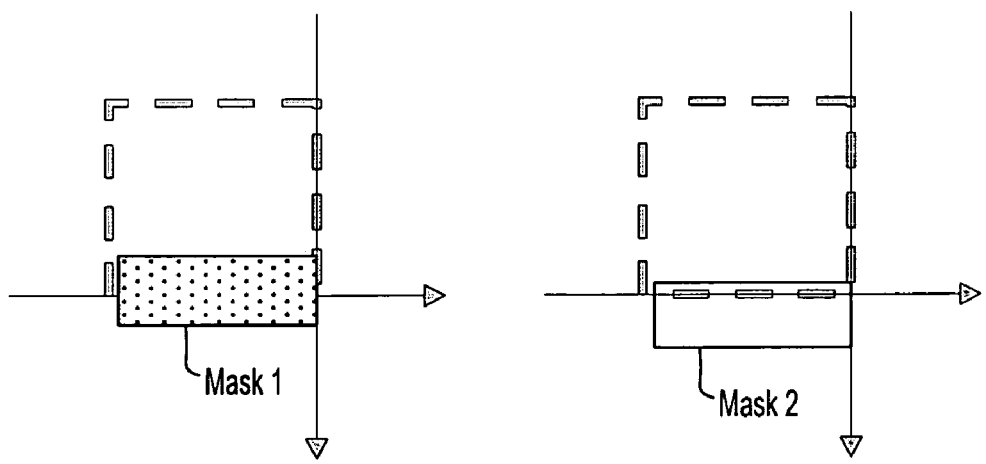
Bottom Right

FIG. 32
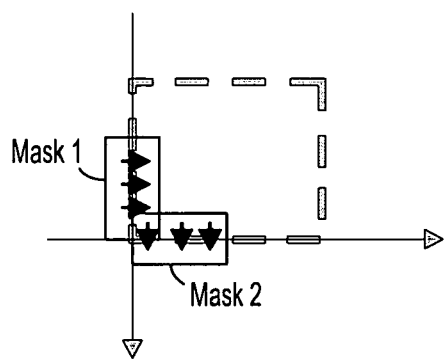
Bottom Left
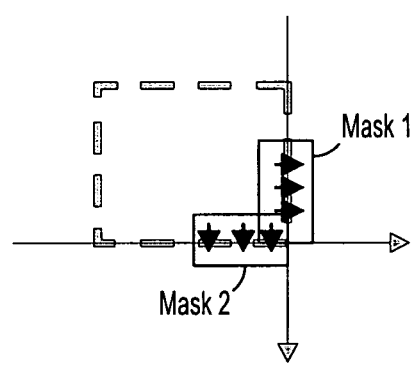
Bottom Right

FIG. 33
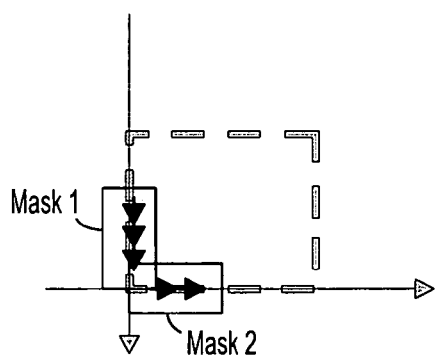
Bottom Left
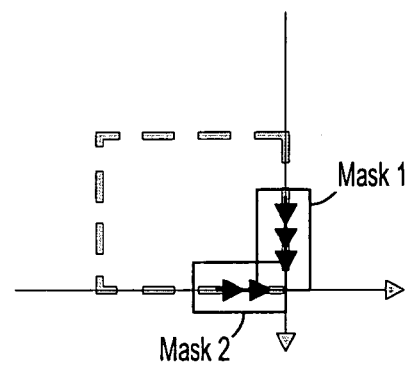
Bottom Right

SYSTEM AND METHOD FOR DETECTING FEATURES FROM IMAGES OF VEHICLES

CROSS REFERENCE TO RELATED UNITED STATES APPLICATIONS

This application claims priority from "Effective Feature Design for Truck Detection", U.S. Provisional Application No. 60/651,411 of Zhu, et al., filed Feb. 9, 2005, the contents of which are incorporated herein by reference.

TECHNICAL FIELD

This invention is directed to design features for a vehicle detector that can be used in driver assistance systems.

DISCUSSION OF THE RELATED ART

The use of Haar Wavelet features was first introduced to detect human faces, and their detector achieved $10^{-4}$ error rate for face detection. Subsequently, a family of extended Haar Wavelet filters has been applied to extract appearance features for car detection and traffic sign detection. For vehicle detection, the basic Haar features have been adapted by adding vehicle-specific features such as the orientational features to describe vehicle corners. Using an extended feature set, a $10^{-3}$ error rate for car detection can be achieved, and $10^{-2}$ error rate in detecting trucks, given the same amount of features are used to construct the detectors. A comparison of error rates is presented in the table below.

| | Pattern class | | | |
|---|---|---|---|---|
| | Faces | Speed Signs | Cars | Trucks |
| Error rate | $10^{-4}$ | $10^{-4}$ | $10^{-3}$ | $10^{-2}$ |

From the performance values obtained by the same scheme of detector design, it can be observed that truck images are more difficult to identify using the aforementioned appearance features. This is due to the large within-class variation in truck appearance.

Improving the performance of truck and car detectors is not only important for vehicle detection, but also important for consistent vehicle tracking because detector response is an important measurement in localizing targets. To improve the performance of truck and car detection, a new set of features designed for truck and car detectors is desirable.

SUMMARY OF THE INVENTION

Exemplary embodiments of the invention as described herein generally include methods and systems for designing a set of effective features to be used in a truck detector, a car detector, and vehicle corner detectors. The detectors are classification methods that use functions of feature values to test hypotheses of a vehicle's appearance.

According to an aspect of the invention, there is provided a method for detecting a feature of a vehicle in an image of said vehicle including providing a digitized image of said vehicle, said image comprising a plurality of intensities corresponding to a domain of points on an 2-dimensional grid, providing a first filter mask over a first subdomain of said image, wherein said filter mask is placed to detect a feature in said image, calculating a function of a gradient of said image inside said first masked subdomain, and detecting the presence or absence of a vehicle feature within said first masked subdomain based on the value of said gradient function.

According to a further aspect of the invention, the vehicle is an automobile.

According to a further aspect of the invention, the vehicle is a truck.

According to a further aspect of the invention, the function is a sum of an absolute value of the log gradient over all pixels in said first masked subdomain.

According to a further aspect of the invention, the method comprises varying the size and position of said first filter mask to obtain a set of said features.

According to a further aspect of the invention, the method comprises providing a second filter mask over a second subdomain of said image, wherein said function is a sum of an absolute value of the log gradient over all pixels in said second masked subdomain.

According to a further aspect of the invention, the feature is detected by analyzing a difference between a sum of a component of said gradient function over said first subdomain and a sum of a same component of said gradient function over said second subdomain.

According to a further aspect of the invention, the feature is detected by analyzing a ratio of a sum of a component of said gradient function over said first subdomain and a sum of a same component of said gradient function over said second subdomain.

According to a further aspect of the invention, the feature is detected by analyzing a comparison of a sum of a component of said gradient function over said first subdomain with a sum of a same component of said gradient function over said second subdomain.

According to a further aspect of the invention, the feature is detected by analyzing a sum of different components of said gradient function over said first subdomain.

According to a further aspect of the invention, the feature is detected by analyzing a ratio of different components of said gradient function over said first subdomain.

According to a further aspect of the invention, the size and position of said second filter mask are varied to obtain a set of said features.

According to another aspect of the invention, there is provided a program storage device readable by a computer, tangibly embodying a program of instructions executable by the computer to perform the method steps for detecting a feature of a vehicle in an image of said vehicle.

BRIEF DESCRIPTION OF THE DRAWINGS

FIG. 1 is a graph comparing bounds on the generalized error of a truck detector using new feature designs and the generalized error of a truck detector using extended Haar wavelet features, according to an embodiment of the invention.

FIG. 2. is a graph comparing bounds on the empirical error of a truck detector using new feature designs and the generalized error of a truck detector using extended Haar wavelet features, according to an embodiment of the invention.

FIG. 3 depicts a back-view of a truck, according to an embodiment of the invention.

FIG. 4 illustrates the masks used for detecting vertical symmetry features, according to an embodiment of the invention.

FIG. 5 illustrates the mask used for detecting consistent horizontal structures based on horizontal image gradients, according to an embodiment of the invention.

FIG. 30 illustrates the masks used for detecting the rank order of local image gradients along a horizontal direction, according to an embodiment of the invention.

FIG. 31 illustrates the masks used for detecting rank order of local image gradients along a vertical direction, according to an embodiment of the invention.

FIG. 32 illustrates the masks used for detecting bottom-left and bottom-right corners based on image gradients, according to an embodiment of the invention.

FIG. 33 illustrates the masks used for detecting image structures consistent with a bottom-left or bottom-right corner based on image gradients, according to an embodiment of the invention.

DETAILED DESCRIPTION OF THE PREFERRED EMBODIMENTS

Figure 6:
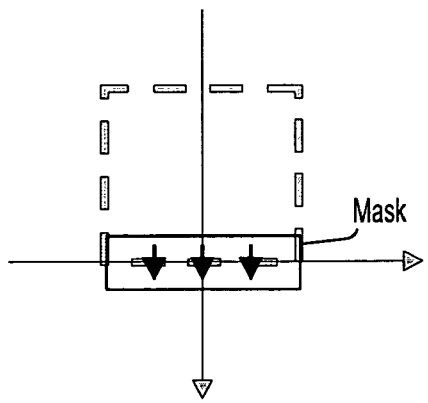
FIG. 6 illustrates the mask used for detecting consistent horizontal structures based on vertical image gradients, according to an embodiment of the invention.

Exemplary embodiments of the invention as described herein generally include systems and methods for designing effective features for a vehicle detector. These features according to embodiments of the invention replace the previously used Haar wavelet based features. The motivation for the new feature design is to seek structural commonality among vehicle examples and use easy-to-compute features to describe such commonality. The image intensity in a vehicle's appearance may vary greatly among different vehicle examples. However, there is considerable amount of commonality in the structures of vehicle objects. For example, most vehicle examples have two strong vertical boundaries and one horizontal boundary, known as occluding edges between vehicle surface and background or road plane. Other attributes, such as symmetry around the central vertical line and strong horizontal structures, are also present in a large population.

Besides the effectiveness in separating vehicle images from non-vehicle images, computational complexity of the features is also an important factor for reasons of computational speed. To take advantage of the computational efficacy of an integral image, features should be calculated in rectangular masks. To reduce the sensitivity to image contrast, the features are extracted from log-gradient images.

As used herein, the term "image" refers to multi-dimensional data composed of discrete image elements (e.g., pixels for 2-D images). Although an image can be thought of as a function from $R^2$ to R, the methods of the inventions are not limited to such images, and can be applied to images of any dimension, e.g. a 2-D picture. For a 2-dimensional image, the domain of the image is typically a 2-dimensional rectangular array, wherein each pixel can be addressed with reference to a set of 2 mutually orthogonal axes. The terms "digital" and "digitized" as used herein will refer to images or volumes, as appropriate, in a digital or digitized format acquired via a digital acquisition system or via conversion from an analog image.

An image according to an embodiment of the invention can be modeled as a scalar function $I:\Omega \to R$, on a 2D domain $\Omega$ of points, where $\Omega \subset R^2$. The log-gradient image is the gradient of the logarithm of image intensities. Denoting the source image as $I(x, y)$, the log-gradient image is defined as:

$$\nabla \log I(x,y) = [\partial_x \log I(x,y), \partial_y \log I(x,y)]^T$$

Two log-gradient images $\partial_x \log I(x, y)$ and $\partial_y \log I(x, y)$ reflect the horizontal and vertical structures in the image. They are calculated as follows:

$$\partial_x \log I(x, y) = \frac{1}{2}[\log I(x+1, y) - \log I(x-1, y)]$$

$$\partial_y \log I(x, y) = \frac{1}{2}[\log I(x, y+1) - \log I(x, y-1)]$$

An efficient implementation of logarithm image $\log I(x, y)$ is through mapping with a pre-calculated table, e.g. $[\log(1), \ldots, \log(255)]$ for 8-bit images, whose pixel values range from 0, 1, ..., 255.

A property of a log-gradient image is that it is invariant to a multiplicative transformation of the source image:

$$\partial_x \log I(x,y) = \partial_x \log \tilde{I}(x,y),$$

$$\partial_y \log I(x,y) = \partial_y \log \tilde{I}(x,y),$$

$$\tilde{I}(x,y) = \lambda \cdot I(x,y), \lambda > 0.$$

If a contrast change can be approximated by multiplicative transformation, an advantage of using features extracted from log-gradient images is that the features are insensitive to contrast change. However, noise in low-intensity regions can be magnified, since $$II_H(x, y) = \sum_{\substack{m=1,\cdots,x \\ n=1,\cdots,y}} |\partial_x \log I(m, n)| \text{ or } \sum_{\substack{m=1,\cdots,x \\ n=1,\cdots,y}} |\partial_x I(m, n)|,$$

$$II_v(x, y) = \sum_{\substack{m=1,\cdots,x \\ n=1,\cdots,y}} |\partial_y \log I(m, n)| \text{ or } \sum_{\substack{m=1,\cdots,x \\ n=1,\cdots,y}} |\partial_y I(m, n)|.$$

Further processing, such as using a power function $((\partial_x \log I(x, y))^n$ (n>1), can be used to suppress the noise.

If image contrast is well controlled, one can consider using features extracted from the gradient images.

Two integral images $II_H(x, y)$, $II_V(x, y)$, for selecting horizontal and vertical features, can be computed on the absolute values of the log-gradient image (or gradient images):

$$\partial_x \log I(x, y) = \frac{\partial_x I(x, y)}{I(x, y)}.$$

To take the advantage of integral image computation, the features under consideration are calculated in rectangular masks. In particular, features for vehicle detection are calculated in gradient images to describe horizontal and vertical image structures. In the following, there are illustrated several types of new features and their filter masks on the log-gradient/gradient images $|\partial_x \log I(x, y)|$, $|\partial_y \log I(x, y)|$. Note that such features can be used to build a car detector as well.

In describing the following detector features for detecting trucks, a back-view image of truck, depicted in FIG. 3, should be kept in mind. Note the arrows in the figure indicating vertical and horizontal direction, and the dotted lines outlining a rectangle that describes the shape of the back view.

Illustrative embodiments of mask(s) for detecting these features are presented in FIGS. 4-33. Note that these masks are exemplary and non-limiting, and other masks can be defined and still be within the scope of an embodiment of the invention. In each of these drawing figures, an outer dashed line represents an outline of the vehicle whose features are sought, and the boxes with a solid black outline represent the masks used to localize the features. The arrows within the black outline represent the direction of the gradient: horizontal arrows represent an x-component of the gradient, while vertical arrows represent a y-component of the gradient. Some features can be detected by evaluating one gradient component, while other features can be detected by evaluating and analyzing both components of the gradient.

Symmetry_vertical:

feature=sum($|\partial_y \log I(x,y)|$ in mask 1)−sum($|\partial_y \log I(x,y)|$ in mask 2).

As illustrated in FIG. 4, mask 1 and mask 2 are placed on the left and right boundary of an object of interest. By varying the vertical position and the size of the masks, one can obtain a set of "Symmetry_vertical" type features. These types of features capture the symmetrical vertical structures around the left and right borders.

Gradient_consistency_horizontal:

feature=sum($|\partial_x \log I(x,y)|$ in mask).

The mask is placed to emphasize the consistent horizontal edges, as illustrated in FIG. 5. By varying the vertical position and the size of the mask, one can obtain a set of "Gradient_consistency_horizontal" type features. This type of feature describes the structural consistency in a horizontal direction.

Gradient_vertical:

feature=sum($|\partial_y \log I(x,y)|$ in mask).

A mask is placed on the bottom edge of the object of interest, as illustrated in FIG. 6. By varying the size of the mask, one can obtain a set of "Gradient_vertical" type features. This type of feature describes the horizontal occluding edge between a vehicle and a road surface.

RATIO_Vertical:

feature=sum($|\partial_y \log I(x,y)|$ in mask 1)/sum(($|\partial_y \log I(x,y)|$ in mask 2).

Figure 7:
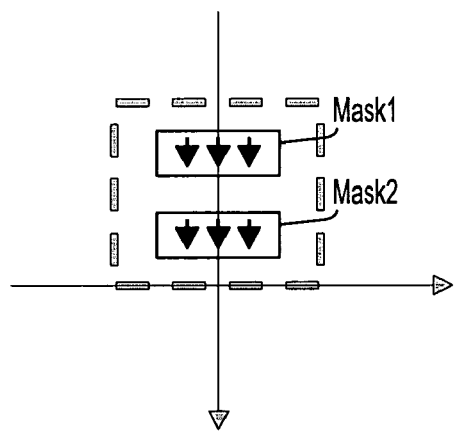
FIG. 7 illustrates the mask used for detecting a vertical gradient ratio, according to an embodiment of the invention.

As illustrated in FIG. 7, two masks are aligned in size and horizontal position on the object. By varying the vertical position of the masks, one can obtain a set of "RATIO_Vertical" type features. This type of feature describes the property that regular horizontal edges are concentrated in the lower part of a vehicle's appearance.

Gradient_horizontal:

feature=sum($|\partial_x \log I(x,y)|$ in mask).

Figure 8:
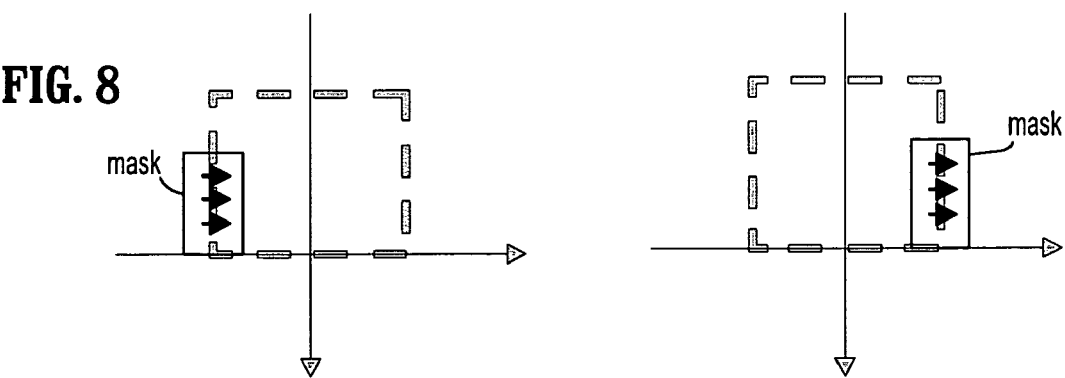
FIG. 8 illustrates the mask used for detecting consistent vertical structures based on horizontal image gradients, according to an embodiment of the invention.

As illustrated in FIG. 8, the mask is placed on the left/right borders of the object. By varying the size and vertical position of the mask, one can obtain a set of "Gradient_horizontal"

type features. This type of feature describes the vertical boundaries of a vehicle's appearance.

Gradient_consistency_vertical:

feature=sum($|\partial_y \log I(x,y)|$ in mask).

Figure 9:
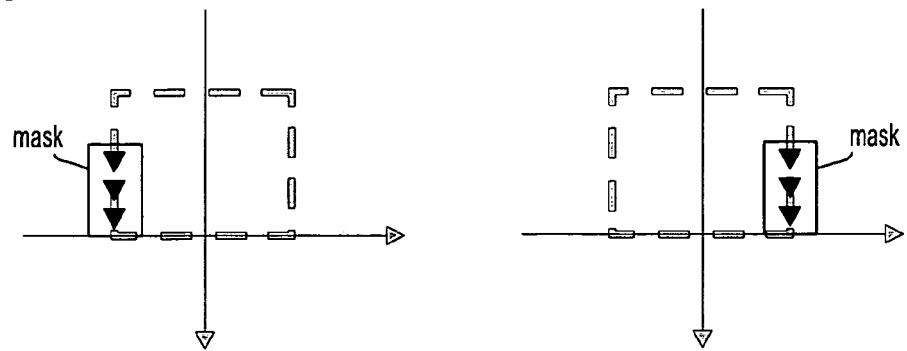
FIG. 9 illustrates the mask used for detecting consistent vertical structures based on vertical image gradients, according to an embodiment of the invention.

As illustrated in FIG. 9, the mask is placed on the left/right border of the object. By varying the size and the vertical position of the mask, one can obtain a set of "Gradient_horizontal" type features. This type of feature describes consistent vertical structures observed around vehicle boundaries.

Ratio_horizontal:

feature=sum($|\partial_x \log I(x,y)|$ in mask 1)/sum($|\partial_x \log I(x,y)|$ in mask 2).

Figure 10:
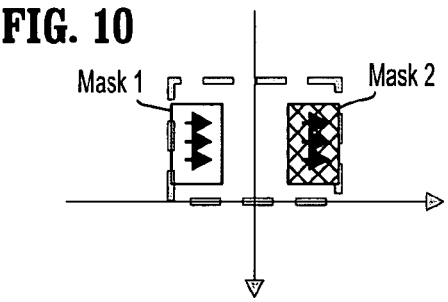
FIG. 10 illustrates the mask used for detecting a horizontal gradient ratio, according to an embodiment of the invention.

As illustrated in FIG. 10, symmetrical masks are placed around the central vertical line. By varying the size and position of the masks, one can obtain a set of "Ratio_horizontal" type features. This type of feature describes the symmetry of vertical structures.

End_horizontal:

feature=sum($|\partial_y \log I(x,y)|$ in mask 1)−sum($|\partial_y \log I(x,y)|$ in mask 2).

Figure 11:
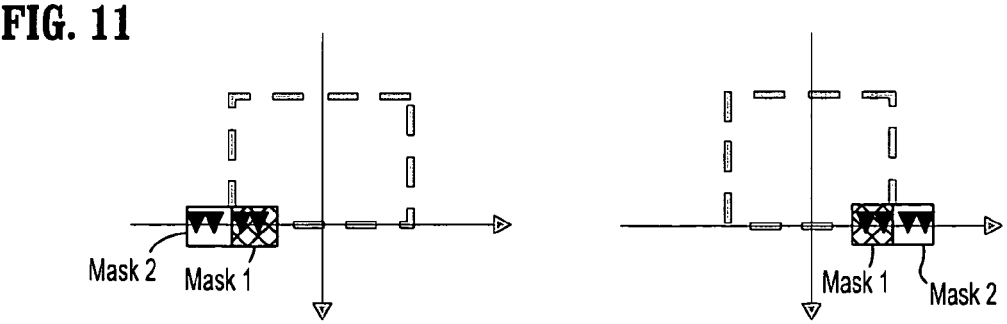
FIG. 11 illustrates the mask used for detecting the end of a horizontal structure based on vertical image gradient, according to an embodiment of the invention.

As illustrated in FIG. 11, the mask is placed at a lower corner. By varying the size of the mask, one can obtain a set of "End_horizontal" type features. This type of feature describes the end of a horizontal edge.

End_vertical:

feature=sum($|\partial_x \log I(x,y)|$ in mask 1)−sum($|\partial_x \log I(x,y)|$ in mask 2).

Figure 12:
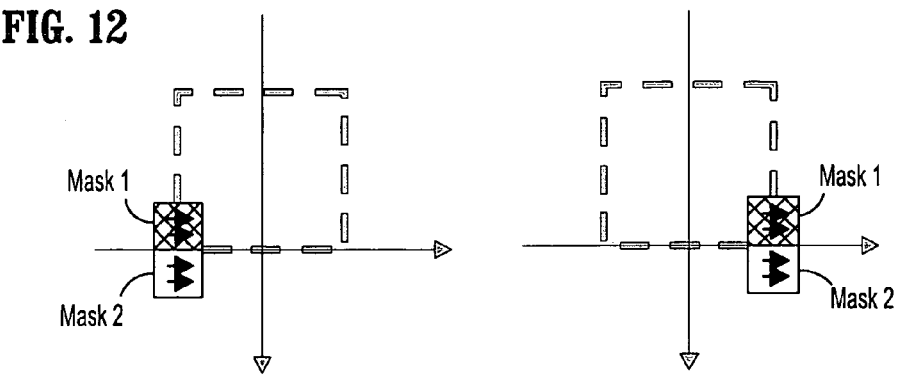
FIG. 12 illustrates the mask used for detecting the end of a vertical structure based on horizontal image gradient, according to an embodiment of the invention.

As illustrated in FIG. 12, the mask is place at a lower corner. By varying the size of the mask, one can obtain a set of "End_vertical" type features. This type of feature describes the end of a vertical edge.

Gradient:

feature=sum($|\partial_x \log I(x,y)|$ in mask)+sum($|\partial_y \log I(x,y)|$ in mask).

Figure 13:
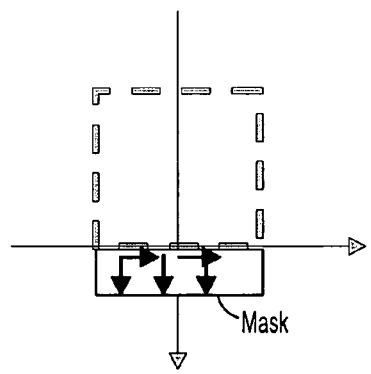
FIG. 13 illustrates the mask used for detecting a road surface, i.e. a non-vehicle region based on horizontal and vertical image gradients, according to an embodiment of the invention.

As illustrated in FIG. 13, the mask is placed underneath the object. By varying the size of the mask, one can obtain a set of "Gradient" features. This type of feature describes the amount of texture of the road surface. It helps to locate the right vehicle boundary.

Orientation:

feature=sum($|\partial_y \log I(x,y)|$ in mask)/sum($|\partial_x \log I(x,y)|$ in mask).

Figure 14:
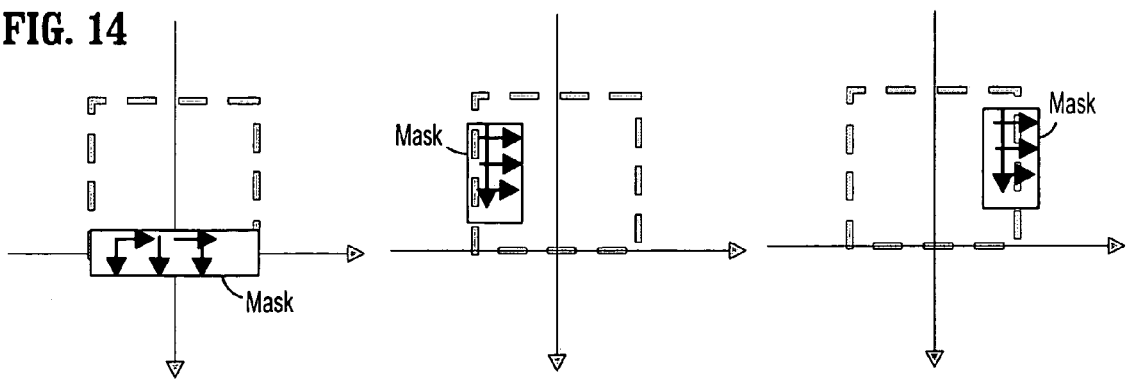
FIG. 14 illustrates the mask used for detecting an orientation of local image structures based on image gradients, according to an embodiment of the invention.

As illustrated in FIG. 14, the mask is placed on the boundaries. By varying the location and size of the mask, one can obtain a set of "Orientation" features. This type of feature describes the orientation of the structures inside the mask.

Rank_horizontal:

$$\text{feature} = \begin{cases} 1 & \text{if sum}(|\partial_x \log I(x,y)| \text{ in mask 1}) \gg \text{sum}(|\partial_x \log I(x,y)| \text{ in mask 2}), \\ 0 & \text{if sum}(|\partial_x \log I(x,y)| \text{ in mask 1}) \cong \text{sum}(|\partial_x \log I(x,y)| \text{ in mask 2}), \\ -1 & \text{if sum}(|\partial_x \log I(x,y)| \text{ in mask 1}) \ll \text{sum}(|\partial_x \log I(x,y)| \text{ in mask 2}). \end{cases}$$

Figure 15:
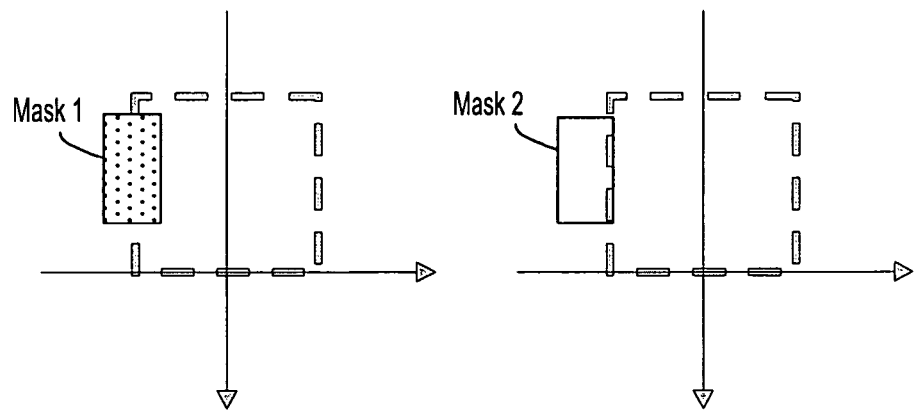
FIG. 15 illustrates the mask used for detecting rank order of local image gradients along a horizontal direction, according to an embodiment of the invention.

As illustrated in FIG. 15, mask 1 is placed on a vertical boundary, mask 2 is vertically aligned with mask 1 and horizontally misaligned with mask 1. By varying the vertical position and the size of the masks, one can obtain a set of "Rank_horizontal" features. This type of feature is motivated by order statistics and describes the exact location of a vertical edge in a horizontal direction, i.e. the horizontal gradient reaches its maximum at the location where mask 1 is placed.

Rank_vertical:

$$\text{feature} = \begin{cases} 1 & \text{if sum}(|\partial_y \log I(x,y)| \text{ in mask 1}) \gg \text{sum}(|\partial_y \log I(x,y)| \text{ in mask 2}), \\ 0 & \text{if sum}(|\partial_y \log I(x,y)| \text{ in mask 1}) \cong \text{sum}(|\partial_y \log I(x,y)| \text{ in mask 2}), \\ -1 & \text{if sum}(|\partial_y \log I(x,y)| \text{ in mask 1}) \ll \text{sum}(|\partial_y \log I(x,y)| \text{ in mask 2}). \end{cases}$$

Figure 16:
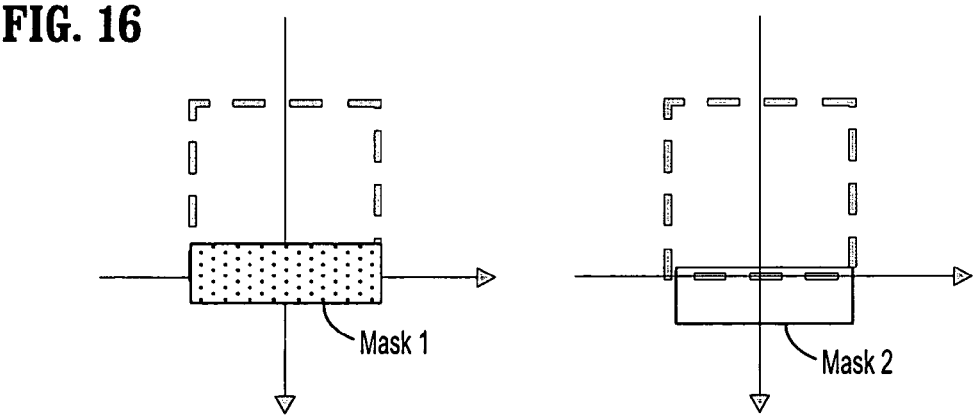
FIG. 16 illustrates the mask used for detecting rank order of local image gradients along a vertical direction, according to an embodiment of the invention.

As illustrated in FIG. 16, mask 1 is placed on a horizontal boundary, mask 2 is horizontally aligned with mask 1 and vertically misaligned with mask 1. By varying the horizontal position and the size of the masks, one can obtain a set of "Rank_vertical" features. This type of feature is motivated by order statistics and describes the exact location of a horizontal edge in a vertical direction, i.e. the vertical gradient reaches its maximum at the location where mask 1 is placed.

In addition to the truck detection features just listed, the following additional features for automobile detection can be defined, according to an embodiment of the invention.

Gradient_corner_BL, Gradient_corner_BR:

feature=sum($|\partial_x \log I(x,y)|$ in mask 1)+sum($|\partial_y \log I(x,y)|$ in mask 2).

Figure 17:
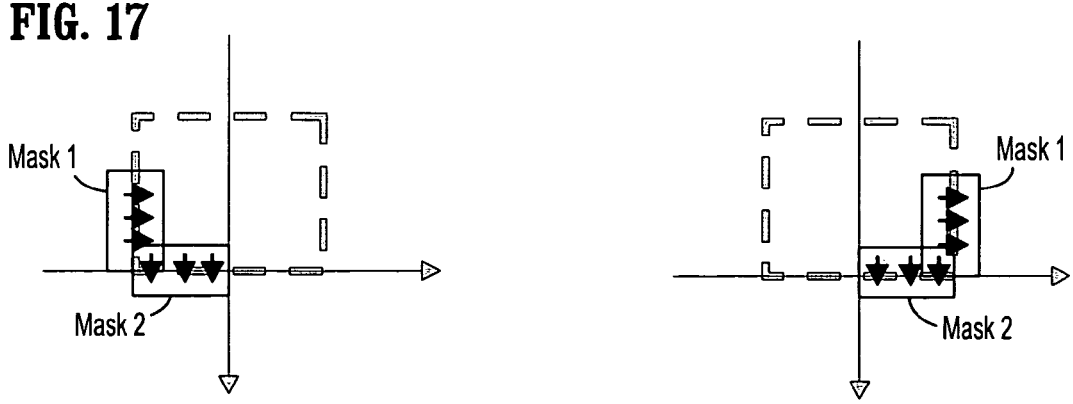
FIG. 17 illustrates the mask used for detecting a bottom-left or bottom-right corner based on image gradients, according to an embodiment of the invention.

As illustrated in FIG. 17, the masks are placed at either the bottom left or bottom right corner of the car with mask 1's lower boundary aligned with the bottom of the car and mask 2's side boundary (depending on the corner) aligned with the side of the car. By varying the sizes of the masks, one can obtain sets of "Gradient_corner_BL" and "Gradient_corner_BR" type features. These types of features describe the image structure of the corners.

Gradient_consistency_corner_BL, Gradient_consistency_corner_BR:

feature=sum($|\partial_y \log I(x,y)|$ in mask 1)+sum($|\partial_x \log I(x,y)|$ in mask 2).

Figure 18:
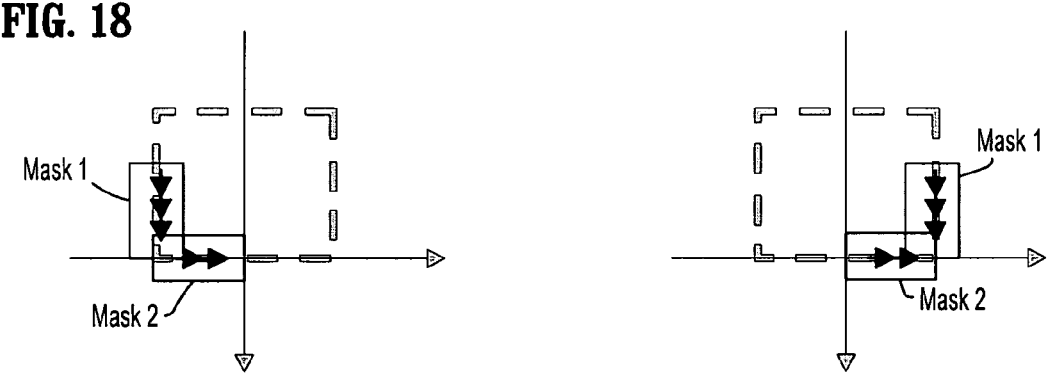
FIG. 18 illustrates the mask used for detecting image structures consistent with a bottom-left or bottom-right corner based on image gradients, according to an embodiment of the invention.

As illustrated in FIG. 18, the masks are placed at either the bottom left or bottom right corner of the car with mask 1's lower boundary aligned with the bottom of the car and mask 2's side boundary (according to the corner) aligned with the side of the car. By varying the sizes of the mask, one can obtain sets of "Gradient_consistency_corner_BL" and "Gradient_consistency_corner_BR" type features. These types of features describe the image structure of the corners.

Figure 19:
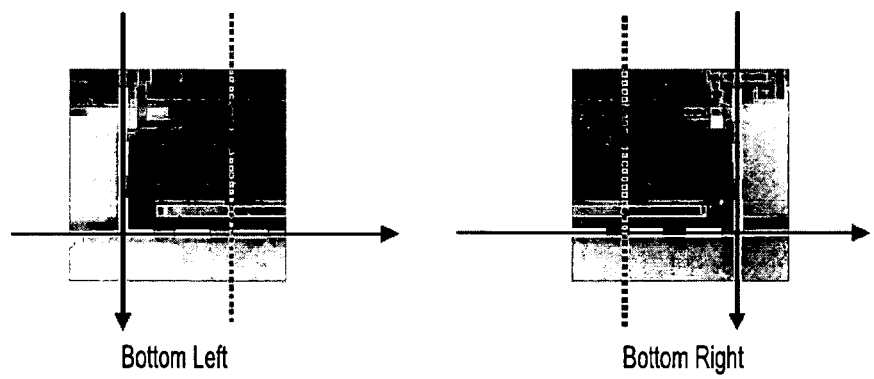
FIG. 19 depicts two back-views of an automobile's bottom-left and bottom-right corners, according to an embodiment of the invention.

Features for Components:

Additional features can be defined for automobile components. FIG. 19 depicts two back-views of an automobile, according to an embodiment of the invention. As illustrated in FIG. 19, these features are designed for detecting the bottom left corner and bottom right corner of a vehicle. The dotted lines in the figures are the center line of the vehicles, which are used as reference for the "Ratio_horizontal" feature, described below.

Gradient_consistency_horizontal:

feature=sum($|\partial_x \log I(x,y)|$ in mask).

Figure 20:
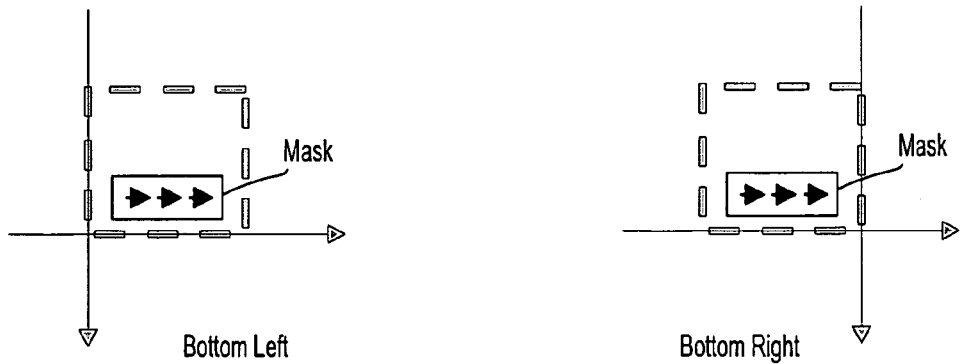
FIG. 20 illustrates the mask used for detecting a consistent horizontal image structure based on horizontal image gradients, according to an embodiment of the invention.

As illustrated in FIG. 20, a mask is placed to emphasize the consistent horizontal edges. By varying the vertical position and the size of the mask, one can obtain a set of "Gradient_ consistency_horizontal" type features. These types of features describe the structural consistency in horizontal direction.

Gradient_vertical:

feature=sum($|\partial_y \log I(x,y)|$ in mask).

Figure 21:
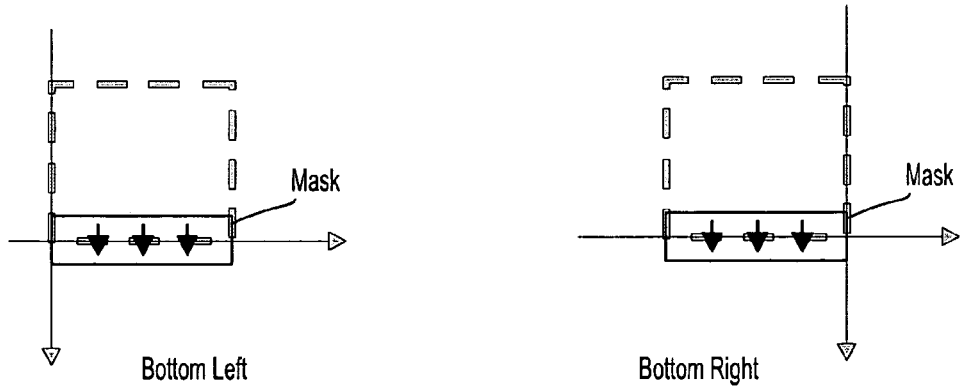
FIG. 21 illustrates the mask used for detecting a horizontal image structure based on vertical image gradient, according to an embodiment of the invention.

As illustrated in FIG. 21, a mask is placed on the bottom edge. By varying the size of the mask, one can obtain a set of "Gradient_vertical" type features. These types of features describe the horizontal occluding edge between a vehicle and the road surface.

RATIO_Vertical:

feature=sum($|\partial_y \log I(x,y)|$ in mask 1)/sum(($|\partial_y \log I(x,y)|$ in mask 2).

Figure 22:
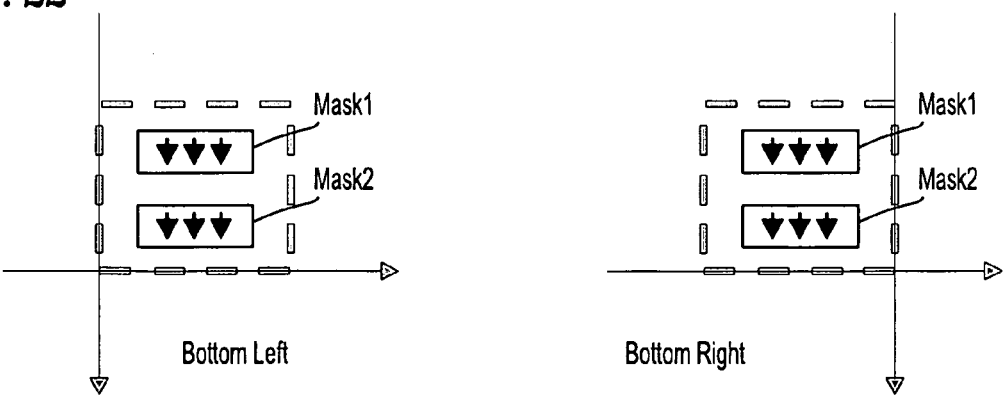
FIG. 22 illustrates the mask used for detecting a vertical gradient ratio, according to an embodiment of the invention.

As illustrated in FIG. 22, two masks are aligned in size and horizontal position. By varying the vertical position of the masks, one can obtain a set of "RATIO_Vertical" type features. This type of feature describes the property that regular horizontal edges are concentrated in the lower part of a vehicle's appearance.

Gradient_horizontal:

feature=sum($|\partial_x \log I(x,y)|$ in mask)

Figure 23:
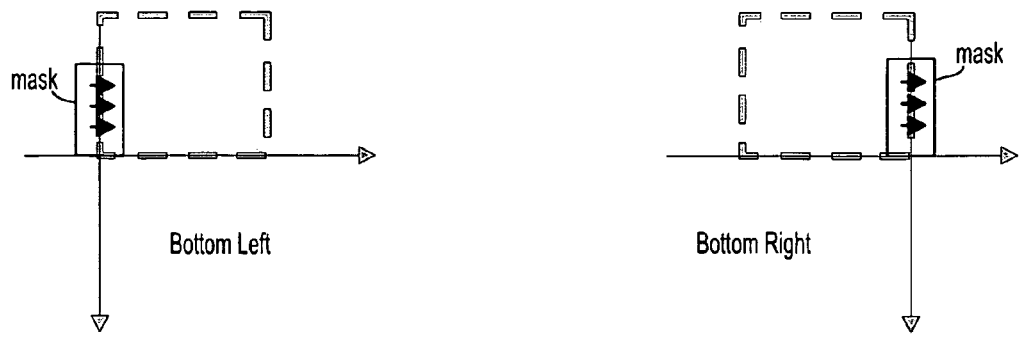
FIG. 23 illustrates the mask used for detecting a vertical image structure based on horizontal image gradients, according to an embodiment of the invention.

As illustrated in FIG. 23, a mask is placed on the left/right borders of an object. By varying the size and vertical position of the mask, one can obtain a set of "Gradient_horizontal" type features. This type of feature describes the vertical outer boundaries of a bottom-left or bottom-right corner of a vehicle's appearance.

Gradient_consistency_vertical:

feature=sum($|\partial_y \log I(x,y)|$ in mask).

Figure 24:
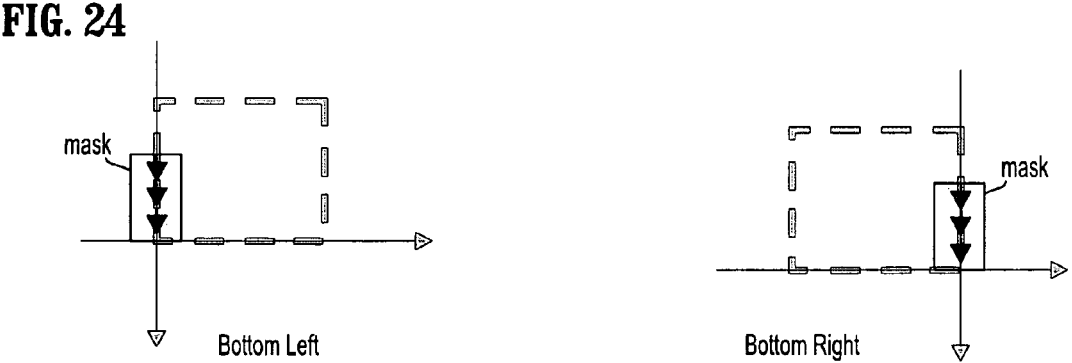
FIG. 24 illustrates the mask used for detecting a consistent vertical image structure based on vertical image gradients, according to an embodiment of the invention.

As illustrated in FIG. 24, a mask is placed on the left/right border of an object. By varying the size and the vertical position of the mask, one can obtain a set of "Gradient_horizontal" type features. This type of feature describes consistent vertical structures of a vehicle's appearance.

Ratio_horizontal:

feature=sum($|\partial_x \log I(x,y)|$ in mask 1)/sum($|\partial_x \log I(x,y)|$ in mask 2).

Figure 25:
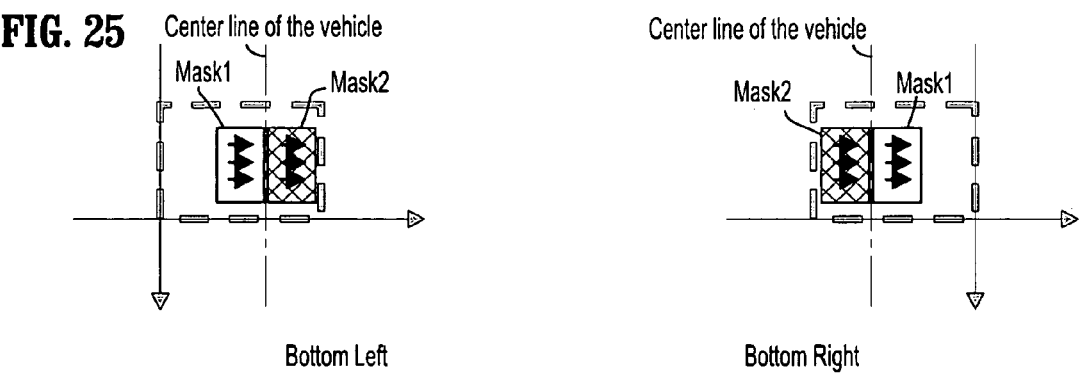
FIG. 25 illustrates the mask used for detecting a horizontal image gradient ratio, according to an embodiment of the invention.

As illustrated in FIG. 25, the masks are symmetrical around the central vertical line. By varying the size and position of the masks, one can obtain a set of "Ratio_horizontal" type features. This type of feature describes the symmetry of vertical structures.

End_horizontal:

feature=sum($|\partial_y \log I(x,y)|$ in mask 1)−sum($|\partial_y \log I(x,y)|$ in mask 2).

Figure 26:
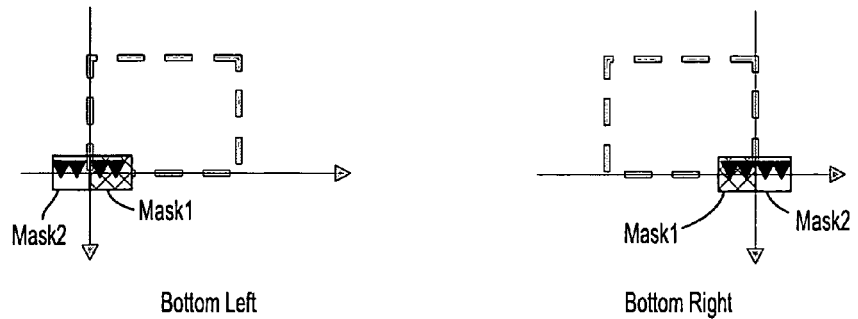
FIG. 26 illustrates the mask used for detecting the end of a horizontal image structured based on vertical image gradients, according to an embodiment of the invention.

As illustrated in FIG. 26, a mask is placed at a lower corner. By varying the size of the mask, we obtain a set of "End_horizontal" type features. This type of feature describes the end of a horizontal edge.

End_vertical:

feature=sum($|\partial_x \log I(x,y)|$ in mask 1)−sum($|\partial_x \log I(x,y)|$ in mask 2).

Figure 27:
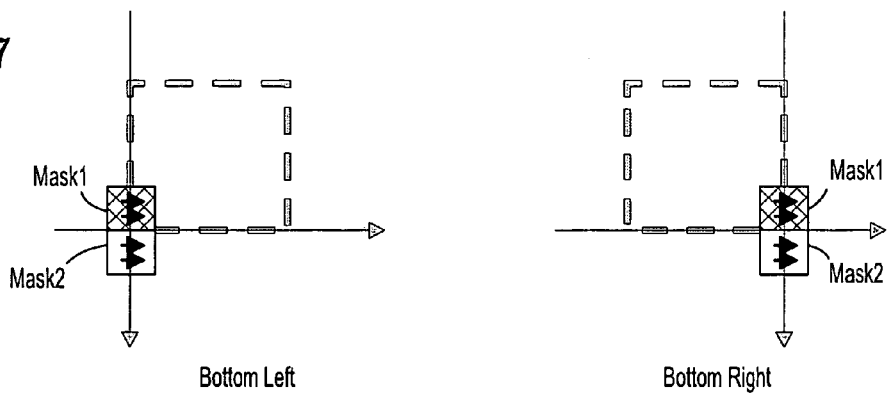
FIG. 27 illustrates the mask used for detecting the end of a vertical image structure based on horizontal image gradients, according to an embodiment of the invention.

As illustrated in FIG. 27, a mask is place at a lower corner. By varying the size of the mask, one can obtain a set of "End_vertical" type features. This type of feature describes the end of a vertical edge.

Gradient:

feature=sum($|\partial_x \log I(x,y)|$ in mask)+sum($|\partial_y \log I(x,y)|$ in mask).

Figure 28:
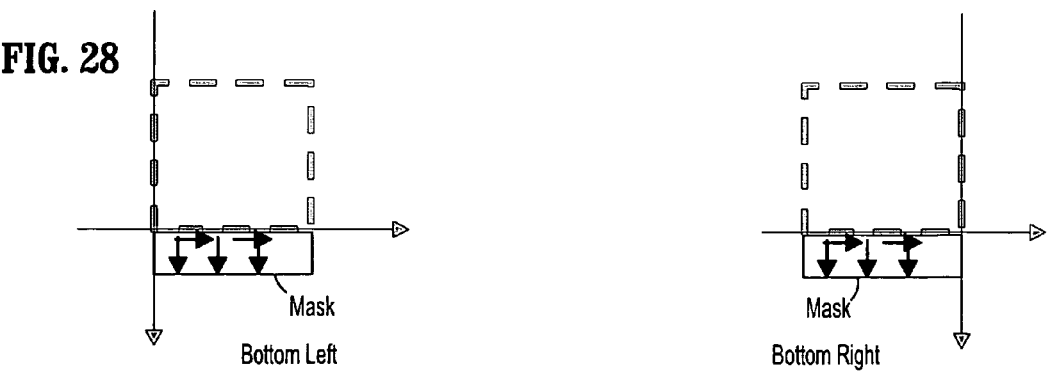
FIG. 28 illustrates the mask used for detecting a road surface, i.e. a non-vehicle region based on horizontal and vertical image gradients, according to an embodiment of the invention.

As illustrated in FIG. 28, a mask is placed underneath the object. By varying the size of the mask, one can obtain a set of "Gradient" features. These types of features describe the texture of the road surface, and help to locate the right boundary of a vehicle's appearance.

Orientation:

feature=sum($|\partial_y \log I(x,y)|$ in mask)/sum($|\partial_x \log I(x,y)|$ in mask).

Figure 29:
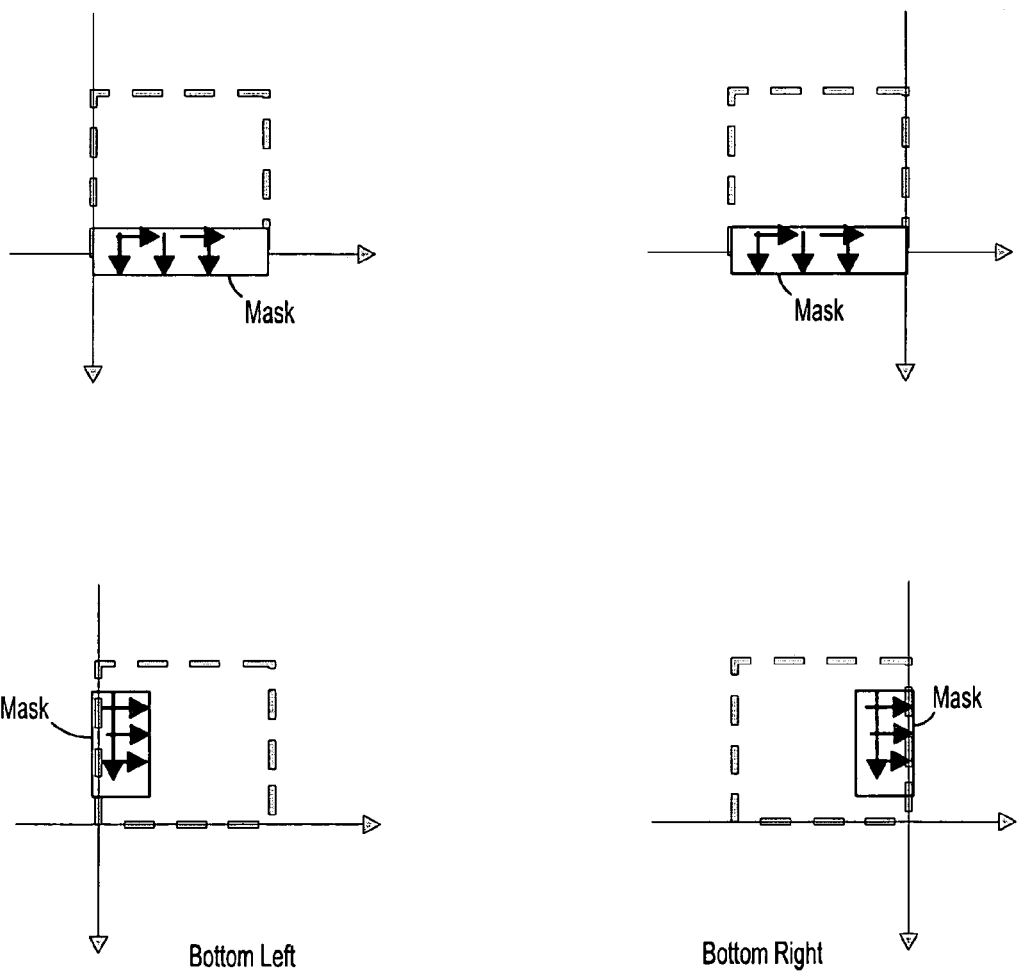
FIG. 29 illustrates the masks used for detecting the orientation of local image structures of a bottom-left or bottom-right corner based on image gradients, according to an embodiment of the invention.

As illustrated in FIG. 29, a mask is placed on the boundaries. By varying the location and size of the mask, one can obtain a set of "Orientation" features. This type of feature describes the orientation of the structures inside the mask.

Rank_horizontal:

$$\text{feature} = \begin{cases} 1 & \text{if sum}(|\partial_x \log I(x,y)| \text{ in mask 1}) \gg \text{sum}(|\partial_x \log I(x,y)| \text{ in mask 2}), \\ 0 & \text{if sum}(|\partial_x \log I(x,y)| \text{ in mask 1}) \cong \text{sum}(|\partial_x \log I(x,y)| \text{ in mask 2}), \\ -1 & \text{if sum}(|\partial_x \log I(x,y)| \text{ in mask 1}) \ll \text{sum}(|\partial_x \log I(x,y)| \text{ in mask 2}). \end{cases}$$

As illustrated in FIG. 30, mask 1 is placed on a vertical boundary; and mask 2 is vertically aligned with mask 1 while being horizontally misaligned with mask 1. By varying the vertical position and the size of the masks, one can obtain a set of "Rank_horizontal" features. These types of features are motivated by order statistics and describe the exact location of a vertical edge in the horizontal direction, i.e. the horizontal gradient reaches its maximum at the location where mask 1 is placed.

Rank_vertical:

$$\text{feature} = \begin{cases} 1 & \text{if sum}(|\partial_y \log I(x,y)| \text{ in mask 1}) \gg \text{sum}(|\partial_y \log I(x,y)| \text{ in mask 2}), \\ 0 & \text{if sum}(|\partial_y \log I(x,y)| \text{ in mask 1}) \cong \text{sum}(|\partial_y \log I(x,y)| \text{ in mask 2}), \\ -1 & \text{if sum}(|\partial_y \log I(x,y)| \text{ in mask 1}) \ll \text{sum}(|\partial_y \log I(x,y)| \text{ in mask 2}). \end{cases}$$

As illustrated in FIG. 31, mask 1 is placed on a horizontal boundary, while mask 2 is horizontally aligned with mask 1 and vertically misaligned with mask 1. By varying the horizontal position and the size of the masks, one can obtain a set of "Rank_vertical" features. These types of features are motivated by order statistics and describes the exact location of a horizontal edge in the vertical direction, i.e. the vertical gradient reaches its maximum at the location where mask 1 is placed.

Gradient_corner_BL, Gradient_corner_BR:

feature=sum($|\partial_x \log I(x,y)|$ in mask 1)+sum($|\partial_y \log I(x,y)|$ in mask 2).

As illustrated in FIG. 32, the masks are placed at either the bottom left or bottom right corner of the car with the lower boundary of mask 1 aligned with the bottom of the car and the side boundary of mask 2, depending on the corner, aligned with the side of the car. By varying the sizes of the mask, one can obtain sets of "Gradient_corner_BL" and "Gradient_corner_BR" type features. These types of features describe the image structures of the corners.

Gradient_consistency_corner_BL, Gradient_consistency_corner_BR:

feature=sum($|\partial_y \log I(x,y)|$ in mask 1)+sum($|\partial_x \log I(x,y)|$ in mask 2).

As illustrated in FIG. 33, the masks are placed at either the bottom left or bottom right corner of the car with the lower boundary of mask 1 aligned with the bottom of the car and the side boundary of mask 2, according to the corner, aligned with the side of the car. By varying the sizes of the mask, one can obtain sets of "Gradient_consistency_corner_BL" and "Gradient_consistency_corner_BR" type features. These types of features describe the image structures of the corners.

Figure 35:
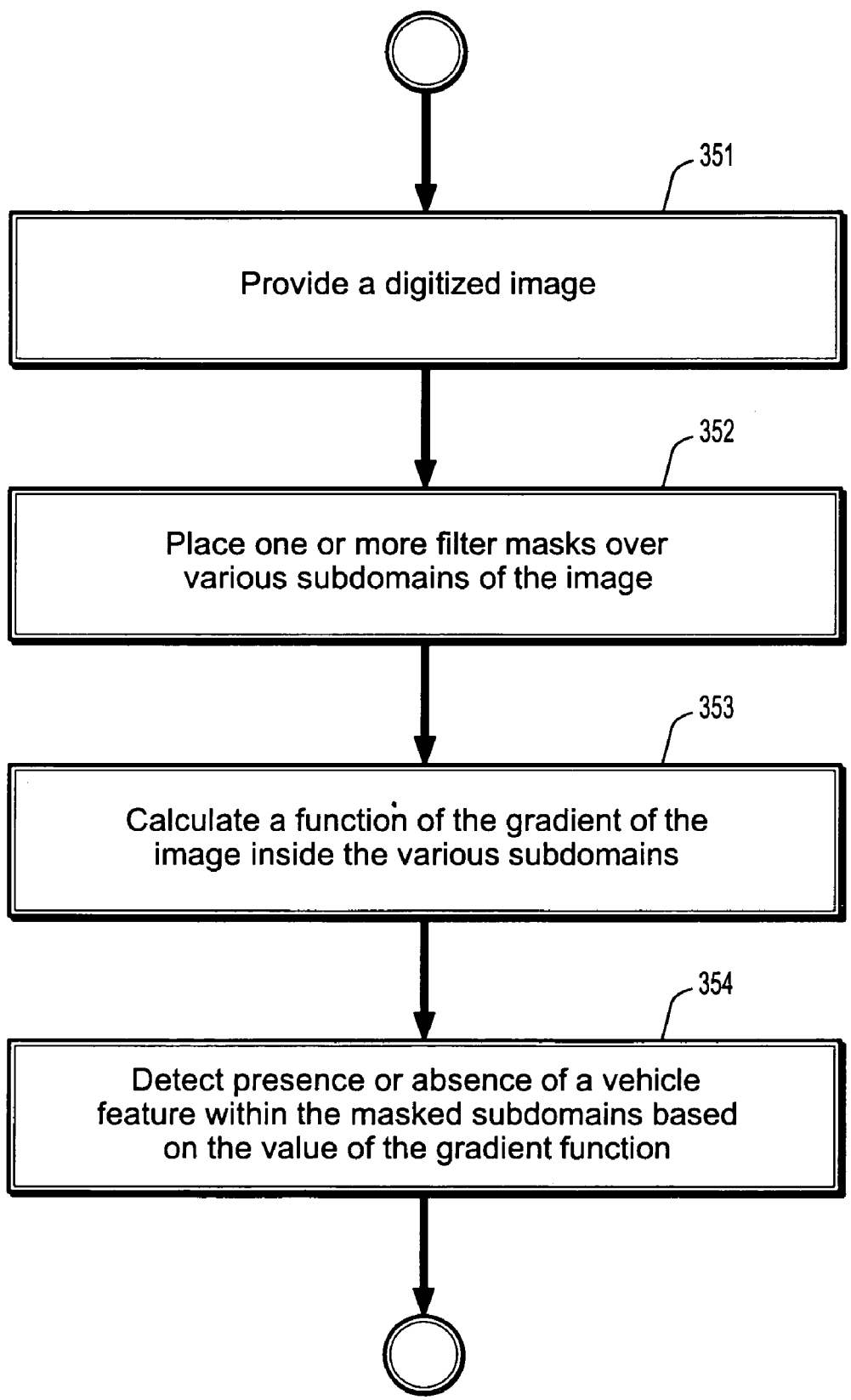
FIG. 35 depicts a flow chart of a method for extracting effective features for a vehicle detector, according to an embodiment of the invention.

A flow chart of a method for extracting effective features for a vehicle detector, according to an embodiment of the invention, is depicted in FIG. 35. Referring now to the figure, at step 351, a digitized image is provided. The image source can be, for example, an image from a still camera, or a frame extracted from a sequence of moving video images, either digital or analog. At step 352, one or more filter masks are placed over various subdomains of the image, as explained above. The number, size and placement of the masks depends upon the features sought to be extracted. At step 353, a function of the gradient of the image in the various subdomains is calculated. An exemplary function is a sum of the absolute value of the log-gradient x and y components, summed over all pixels in each of the subdomains. Various other functions can be calculated by analyzing the same components in different subdomains, different components in different subdomains, or different components in the same subdomain. Some features involve only analyzing a single component in one subdomain. Exemplary analyses include examining the difference, sum or ratio of function components, or comparing the value of function components. At step 354, the presence or absence of a vehicle feature is determined from the analysis of the components of the gradient functions.

FIGS. 1 and 2 illustrate error comparisons between the new feature design and the extended Haar wavelet features. In particular, FIG. 1 compares the upper bounds of the generalized error of a truck detector using features defined with extended Haar wavelets versus using features according to an embodiment of the invention, where the error is plotted as a function of the number of features used in the detector. The generalized error is the error obtained on a random set of testing data, which is unknown in the training stage. FIG. 2 compares the empirical error of a truck detector using features defined with extended Haar wavelets versus features according to an embodiment of the invention, where the error is plotted as a function of the number of features used in the detector. The empirical error is the error rate obtained on training data, which is available a priori. In both cases, the errors from using features defined according to an embodiment of the invention is noticeably lower than the errors from using Haar wavelet features.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 34:
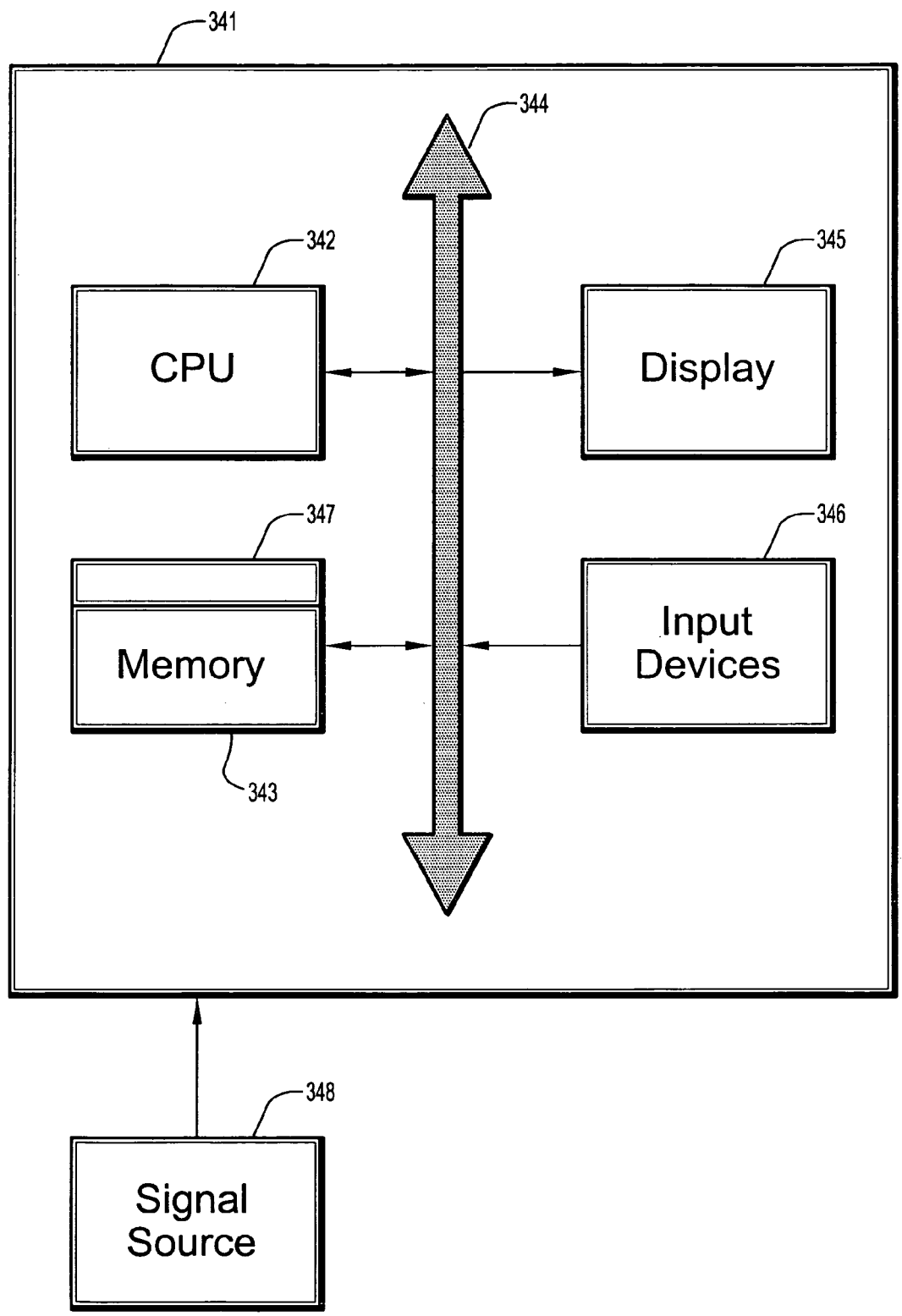
FIG. 34 is a block diagram of an exemplary computer system for extracting effective features for a vehicle detector, according to an embodiment of the invention.

FIG. 34 is a block diagram of an exemplary computer system for implementing a feature detector according to an embodiment of the invention. Referring now to FIG. 34, a computer system 341 for implementing the present invention can comprise, inter alia, a central processing unit (CPU) 342, a memory 343 and an input/output (I/O) interface 344. The computer system 341 is generally coupled through the I/O interface 344 to a display 345 and various input devices 346 such as a mouse and a keyboard. The support circuits can include circuits such as cache, power supplies, clock circuits, and a communication bus. The memory 343 can include random access memory (RAM), read only memory (ROM), disk drive, tape drive, etc., or a combinations thereof. The present invention can be implemented as a routine 347 that is stored in memory 343 and executed by the CPU 342 to process the signal from the signal source 348. As such, the computer system 341 is a general purpose computer system that becomes a specific purpose computer system when executing the routine 347 of the present invention.

The computer system 341 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of detecting a feature of a vehicle in an image of said vehicle, said method comprising using a processor to perform the steps of:
   providing a digitized image of said vehicle, said image comprising a plurality of intensities corresponding to a domain of points on an 2-dimensional grid;
   providing a first filter mask over a first subdomain of said image, wherein said first filter mask is placed to detect the feature in said image;
   calculating a function of a gradient of said image inside said first masked subdomain, wherein said function is a sum of an absolute value of a log gradient over all pixels in said first masked subdomain; and
   detecting the presence or absence of a vehicle feature within said first masked subdomain based on the value of said gradient function.

2. The method of claim 1, wherein said vehicle is an automobile.

3. The method of claim 1, wherein said vehicle is a truck.

4. The method of claim 1, further comprising varying the size and position of said first filter mask to obtain a set of features.

5. The method of claim 1, further comprising providing a second filter mask over a second subdomain of said image, wherein said function is a sum of an absolute value of the log gradient over all pixels in said second masked subdomain.

6. The method of claim 5, wherein said feature is detected by analyzing a difference between a sum of a component of said gradient function over said first subdomain and a sum of a same component of said gradient function over said second subdomain.

7. The method of claim 5, wherein said feature is detected by analyzing a ratio of a sum of a component of said gradient function over said first subdomain and a sum of a same component of said gradient function over said second subdomain.

8. The method of claim 5, wherein said feature is detected by analyzing a comparison of a sum of a component of said gradient function over said first subdomain with a sum of a same component of said gradient function over said second subdomain.

9. The method of claim 1, wherein said feature is detected by analyzing a sum of different components of said gradient function over said first subdomain.

10. The method of claim 1, wherein said feature is detected by analyzing a ratio of different components of said gradient function over said first subdomain.

11. The method of claim 5, wherein the size and position of said second filter mask are varied to obtain a set of said features.

12. A method of detecting a feature of a vehicle in an image of said vehicle, said method comprising using a processor to perform the steps of:
providing a digitized image of said vehicle, said image comprising a plurality of intensities corresponding to a domain of points on an 2-dimensional grid;
providing at least one filter mask over a subdomain of said image, wherein said filter mask is placed to detect the feature in said image, wherein the size and position of said at least one filter mask are varied to obtain a set of features; and
calculating a sum of an absolute value of a log gradient over all pixels in said masked subdomain.

13. The method of claim 12, further comprising detecting the presence or absence of a vehicle feature within said masked subdomain based on the value of said sum of said absolute value of said log gradient.

14. Computer readable storage device storing a computer program to perform the method steps for detecting a feature of a vehicle in an image of said vehicle, said method comprising the steps of:
providing a digitized image of said vehicle, said image comprising a plurality of intensities corresponding to a domain of points on an 2-dimensional grid;
providing a first filter mask over a first subdomain of said image, wherein said first filter mask is placed to detect a feature in said image;
calculating a function of a gradient of said image inside said first masked subdomain, wherein said function is a sum of an absolute value of a log gradient over all pixels in said first masked subdomain: and
detecting the presence or absence of a vehicle feature within said first masked subdomain based on the value of said gradient function.

15. The computer readable program storage device of claim 14, wherein said vehicle is an automobile.

16. The computer readable program storage device of claim 14, wherein said vehicle is a truck.

17. The computer readable program storage device of claim 14, the method further comprising varying the size and position of said first filter mask to obtain a set of features.

18. The computer readable program storage device of claim 14, the method further comprising providing a second filter mask over a second subdomain of said image, wherein said function is a sum of an absolute value of the log gradient over all pixels in said second masked subdomain.

19. The computer readable program storage device of claim 18, wherein said feature is detected by analyzing a difference between a sum of a component of said gradient function over said first subdomain and a sum of a same component of said gradient function over said second subdomain.

20. The computer readable program storage device of claim 18, wherein said feature is detected by analyzing a ratio of a sum of a component of said gradient function over said first subdomain and a sum of a same component of said gradient function over said second subdomain.

21. The computer readable program storage device of claim 18, wherein said feature is detected by analyzing a comparison of a sum of a component of said gradient function over said first subdomain with a sum of a same component of said gradient function over said second subdomain.

22. The computer readable program storage device of claim 14, wherein said feature is detected by analyzing a sum of different components of said gradient function over said first subdomain.

23. The computer readable program storage device of claim 14, wherein said feature is detected by analyzing a ratio of different components of said gradient function over said first subdomain.

24. The computer readable program storage device of claim 18, wherein the size and position of said second filter mask are varied to obtain a set of said features.

* * * * *

UNITED STATES PATENT AND TRADEMARK OFFICE
CERTIFICATE OF CORRECTION

PATENT NO.         : 7,620,208 B2
APPLICATION NO.    : 11/313599
DATED              : November 17, 2009
INVENTOR(S)        : Zhu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twenty-sixth Day of October, 2010

David J. Kappos
*Director of the United States Patent and Trademark Office*